Figure 4:
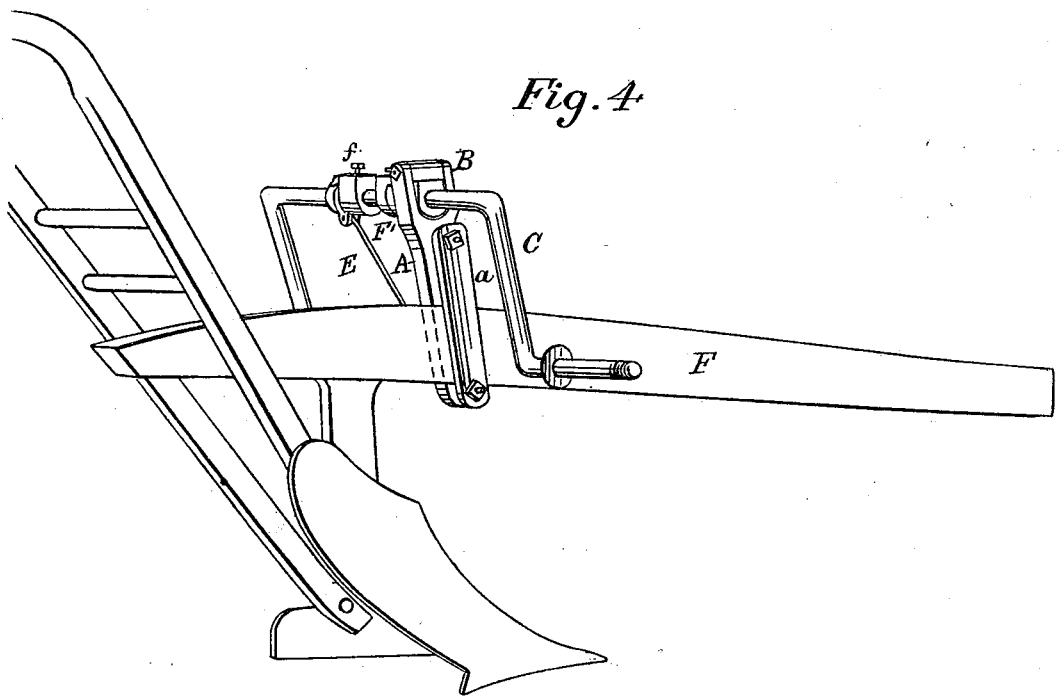

(No Model.)
2 Sheets—Sheet 1.
W. MARTIN.
SULKY PLOW.
No. 273,696. Patented Mar. 6, 1883.
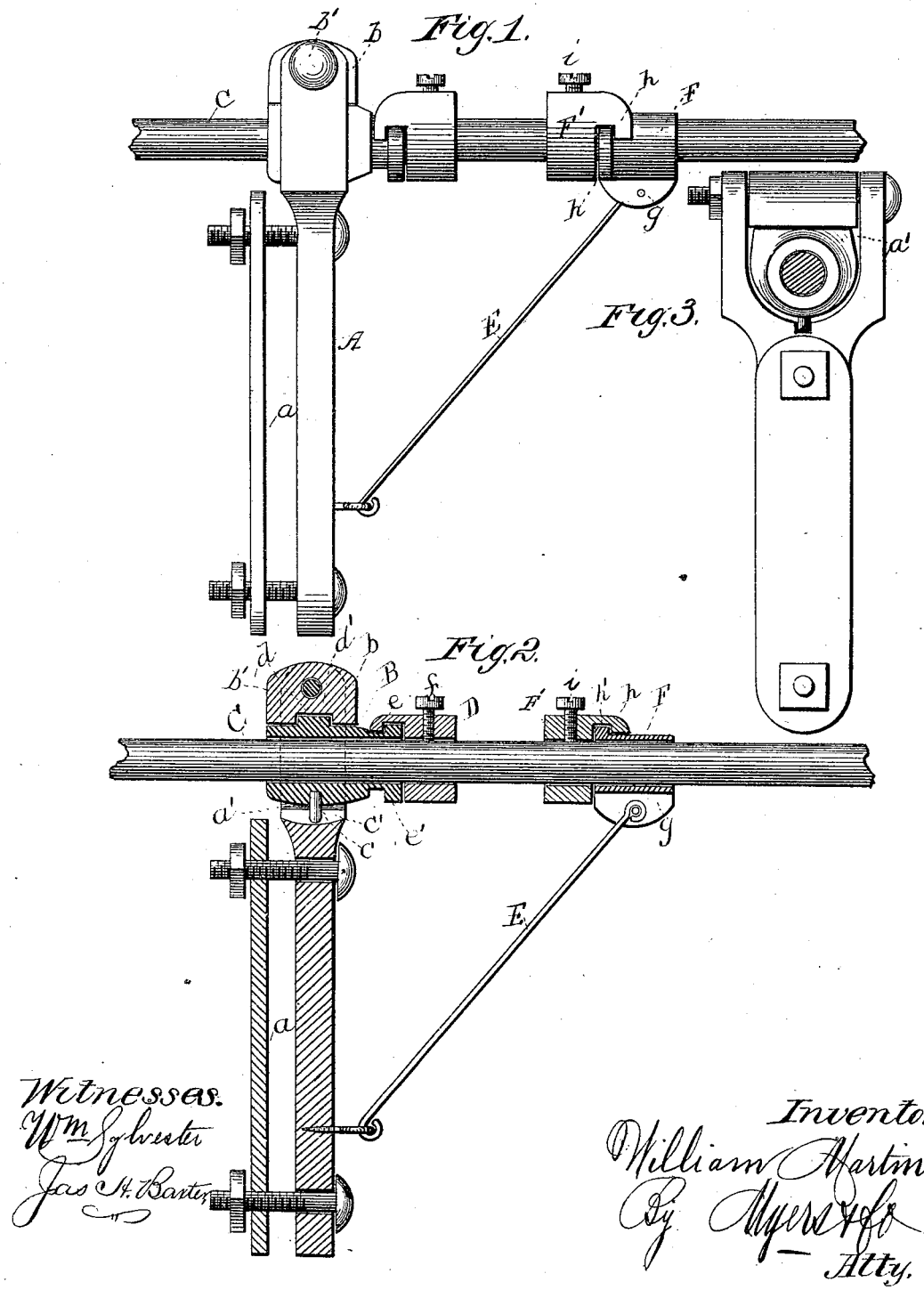
Witnesses.
Wm Sylvester
Jas H Baxter
Inventor.
William Martin
By Myers & Co
Atty.

(No Model.)    W. MARTIN.    2 Sheets—Sheet 2.
SULKY PLOW.

No. 273,696.    Patented Mar. 6, 1883.

Witnesses:
Wm Sylvester
Jas. A. Baxter

Inventor:
William Martin.
By Myers & Co.
Attys.

UNITED STATES PATENT OFFICE.

WILLIAM MARTIN, OF HAVANA, NEW YORK, ASSIGNOR TO FRANK DICKSON, OF SAME PLACE.

SULKY-PLOW.

SPECIFICATION forming part of Letters Patent No. 273,696, dated March 6, 1883.

Application filed August 29, 1882. (No model.)

*To all whom it may concern:*

Be it known that I, WILLIAM MARTIN, a citizen of the United States of America, residing at Havana, in the county of Schuyler and State of New York, have invented certain new and useful Improvements in Swivels for Sulky-Plows, of which the following is a specification, reference being had therein to the accompanying drawings.

This invention relates to certain improvements in sulky-plows, and has for its object to enable the plow to readily free itself without injury from obstructions, and to be leveled when required; and to these ends it consists in the employment of a swivel-jointed connection and a sliding coupling, substantially as hereinafter more fully set forth and claimed.

In the accompanying drawings, Figure 1 is a plan view of my improvement in sulky-plows. Fig. 2 is a sectional view; and Fig. 3 is a front view, partly in section, of the same.

In carrying out my invention I employ a bar, A, to which the plow-standard is clamped at $a$ by the means shown or otherwise. The inner end of the bar A has an aperture or slot, $a'$, providing it with short arms or prongs, which are caused to embrace a sleeve or collar, B, slipped on the crank-rod C of the sulky, and which are pivoted to a block or coupling, $b$, as at $b'$. The sleeve B has a pin or projection, $c$, entering a slot, $c'$, of the bar A, opening into its larger slot $a'$, and also a tongue, $d$, entering a groove, $d'$, of the coupling $b$, whereby the bar is enabled to have longitudinal and lateral play, to permit the plow to readily avoid or rather free itself from an obstruction without injury. The sleeve B is coupled to the crank-rod C by a collar, D, also slipped upon the said rod, and having a hooked flange, $e$, taking over a flange, $e'$, on the sleeve. The collar D has a set-screw, $f$, to effect the adjustment thereof, together with the sleeve and the beam connected thereto, permitting the horizontal adjustment of the plow with its standard. E is a brace or straining rod, connected to the beam A and to the crank-rod C by means of a coupling adapted to slide on the latter, and consisting of the sleeve F, having parallel flanges $g$, (over a pin, secured to and between the same, is hooked the brace or rod E,) and of a collar, F', having a hooked flange, $h$, taking over a flange, $h'$, on the sleeve, and a set-screw, $i$, bearing on the crank-rod C. This coupling, with the rod or brace E, permits the leveling of the plow. As the sleeve F and collar F' is moved outward on the crank-shaft C the bar A is winged or inclined outward, and is secured at the desired angle by means of the set-screw $i$. The rod will be strained or tightened and draw upon and secure the plow-beam in said position, and thus effect the aforesaid result.

I claim and desire to secure by Letters Patent—

1. The combination of the axle C, sleeve B, formed as described, collar D, having set-screw $f$, sleeve F, and collar F', having set-screw $i$, with guide-bar A, having adjustable clamp-plate $a$, brace-rod E, and plow-beam G, substantially as shown and specified.

2. The combination, with the axle C, of the sleeve B, having pin or projection $c$, entering a slot, $c'$, in the guide-bar A, said guide-bar embracing the said sleeve B, and pivoted to a block, $b$, having a groove, $d'$, which receives a tongue, $d$, on the sleeve, substantially as shown and specified.

In testimony whereof I affix my signature in presence of two witnesses.

WILLIAM MARTIN.

Witnesses:
JAMES B. DRAKE,
C. H. DRAKE.